United States Patent
Keller et al.

(10) Patent No.: US 10,422,637 B1
(45) Date of Patent: Sep. 24, 2019

(54) WAVE REFLECTION DEFORMATION SENSING APPARATUS

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 98 days.

(21) Appl. No.: 15/618,902

(22) Filed: Jun. 9, 2017

Related U.S. Application Data

(60) Provisional application No. 62/348,192, filed on Jun. 10, 2016.

(51) Int. Cl.
| | |
|---|---|
| *G01N 3/18* | (2006.01) |
| *G01N 3/32* | (2006.01) |
| *G01B 21/32* | (2006.01) |
| *A41D 19/00* | (2006.01) |

(52) U.S. Cl.
CPC .......... *G01B 21/32* (2013.01); *A41D 19/0027* (2013.01)

(58) Field of Classification Search
CPC ........... G01N 3/18; G01N 3/32; G01N 33/442
See application file for complete search history.

(56) References Cited

U.S. PATENT DOCUMENTS

2016/0283006 A1* 9/2016 Ogura .................. G06F 3/0414

* cited by examiner

*Primary Examiner* — Jamel E Williams
(74) *Attorney, Agent, or Firm* — Fenwick & West LLP

(57) ABSTRACT

A deformation sensing apparatus comprises a transmitter coupled to a propagation channel, and a receiver coupled to the same first end of the propagation channel. The propagation channel of the deformation is a transmission line, where a signal is transmitted by the transmitter and reflected signals are measured by the receiver responsive to the transmitted signals. A bend in the propagation channel results in a change in impedance of the transmission line at a location of the bend, resulting in a reflection of the signal from the location of the bend. The time delay of the reflected signals corresponds to the distance along the length of the channel where a bending of the propagation channel occurs. The amplitude of the reflected signal corresponds to a bend angle.

20 Claims, 6 Drawing Sheets

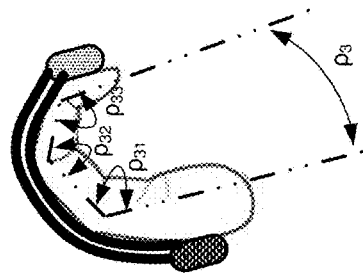
FIG. 6A
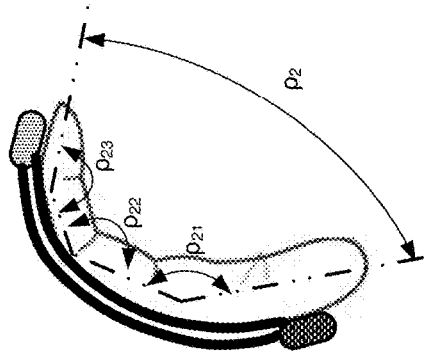
FIG. 6B
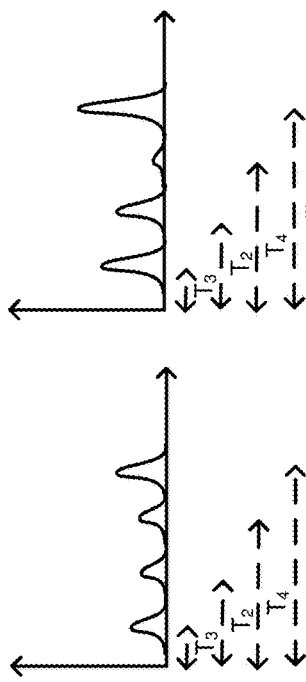
FIG. 6C
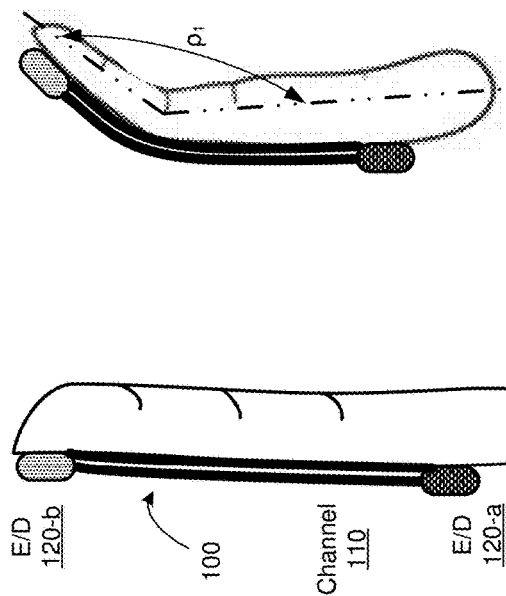
FIG. 6D
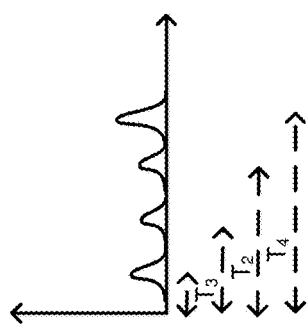
FIG. 6E
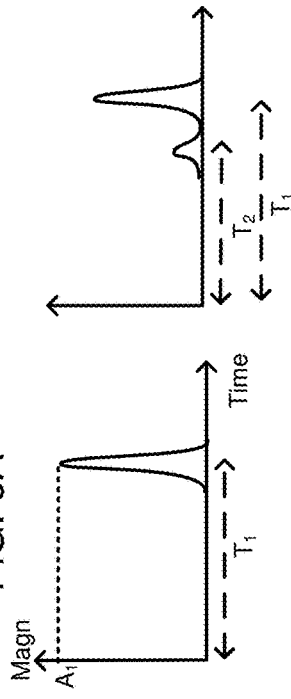
FIG. 6F
FIG. 6G
FIG. 6H

WAVE REFLECTION DEFORMATION SENSING APPARATUS

CROSS REFERENCE TO RELATED APPLICATIONS

This application claims the benefit of U.S. Provisional Application No. 62/348,192, filed Jun. 10, 2016, which is incorporated by reference in its entirety.

BACKGROUND

Virtual reality (VR) systems typically provide multiple forms of sensory output, such as a VR headset and headphones, which operate together to create the illusion that a user is immersed in a virtual world. A VR system can also include an input or wearable device, such as a VR glove, that detects position, acceleration, orientation, and other information associated with the user's hand and provides the information as input. The input can then be used to move a corresponding item in the virtual world (e.g., a hand or other appendage belonging to a character in the virtual world) when the glove detects movement of the user's hand in the real world. A VR glove can also be used to facilitate interactions with other objects in the virtual world. For example, the VR system can allow the user to use the glove to manipulate virtual objects by touching them, picking them up, and moving them.

Strain sensors may be included in an input or a wearable device, such as a VR glove, to facilitate virtual manipulation of virtual objects. Strain sensors measure strain resulting from applied deformations based on a change in an electrical characteristic (e.g., a resistance, an inductance, or a capacitance) of electrical elements (such as resistive strain gauges, capacitive sensors, or inductive sensors) formed therein. However, a conventional strain sensor is unable to resolve multiple measures of deformation (stretch or flex) occurring at different portions (segments) along its length through a common electrical interface (e.g., a single pair of terminals for an array of two terminal devices). Multiple strain sensors, if cascaded along their lengths to resolve measures of deformation along portions of the combined length, use multiple independent conductive wires or terminals to obtain signals from the various different cascaded sensors. This additional wiring can make cascaded sensors unwieldy in some devices.

SUMMARY

A deformation sensing apparatus comprises a deformable energy propagation channel, an energy transmitter coupled to a first end of the propagation channel, and an energy receiver coupled to the same first end of the propagation channel. In some embodiments, the transmitter is an emitter of electromagnetic or acoustic energy and the receiver is a detector, respectively, of electromagnetic or acoustic energy. In some embodiments, the propagation channel of the deformation sensing apparatus is used as a transmission line, where a signal (e.g., an energy pulse) is transmitted by the energy transmitter from the first end of the channel along a length of the transmission line, and reflected signals are measured by the energy receiver at the same first end of the channel responsive to the transmitted signals. A bend in the propagation channel results in a change in impedance of the transmission line at a location of the bend, resulting in a reflection of the signal (e.g., the energy pulse) from the location of the bend, back to the first end of the channel. If multiple bends are present along the channel, each bend may cause a reflected pulse to be transmitted back to the first end of the channel responsive to the same transmitted pulse. The time delay (e.g., propagation time) of the reflected signals corresponds to the distance along the length of the channel where a bending of the propagation channel occurs (and thus a change in impedance of the propagation channel). Furthermore, the amplitude of the reflected signal corresponds to the amount of bending (e.g., an amount of impedance change due to the bending).

In some embodiments, the propagation channel is a multi-segment channel comprising a plurality of propagation channels cascaded along their length-wise axes and separated by emitters and/or detectors. In some embodiments, the deformation (e.g., bend) on each segment or joint of the propagation channel is obtained separately by injecting a pulse of energy into the respective channel segment and measuring the propagation time and intensity of a received pulse reflected from a distal end of that respective channel segment.

The deformation sensing apparatus may be used in wearable devices such as gloves, headsets, or any other fabric that conforms to a body part and can be used to detect and resolve movement of multiple spatial regions or portions of that body part.

In some embodiments, the orientations/bends of points on the wearable device (such as a glove) worn around a body part (e.g., fingers of a hand) are used to determine a state of the body part. For example, the orientations/bends of points on a glove (or other wearable device) are used to provide information about or to render a state of the hand (or other body part) in a VR (virtual reality) environment or VR world. For example, states of a hand (e.g., open, closed, pointing, gesturing, etc.) can be determined based on the bend angles of fingers or finger tips corresponding to the bends or orientations of points on the glove.

BRIEF DESCRIPTION OF THE DRAWINGS

FIGS. 6A-6D include illustrations of a bend angle sensor worn on a finger and comprising a wave reflection deformation sensing apparatus, according to one or more embodiments.

FIGS. 6E-6H illustrate amplitudes and timings of reflected waves within propagation channels of the wave reflection deformation sensing apparatus with deformations applied as illustrated in FIGS. 6A-6D, for measuring bend angles of different joints of the finger, according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
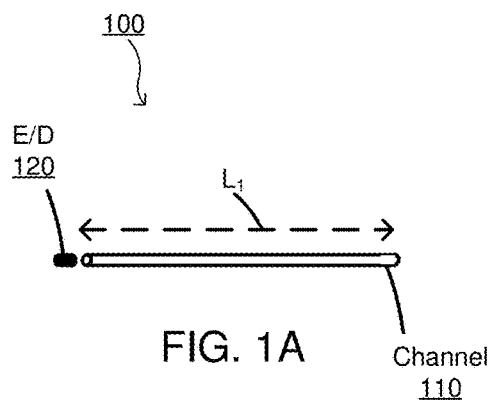
FIGS. 1A-1C illustrate side views of a wave reflection deformation sensing apparatus without and with bends at different points along a length of the apparatus, according to some embodiments.
Figure 1B:
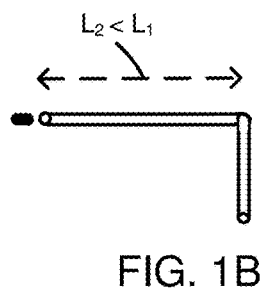
Figure 1C:
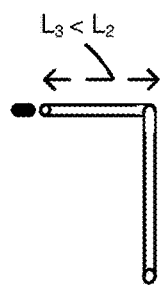

FIGS. 1A-1C illustrate side views of a wave reflection deformation sensing apparatus 100 without and with bends along a length of the apparatus, according to some embodiments. FIG. 1A shows a side view of a wave reflection deformation sensing apparatus 100 without any applied deformation, in accordance with one or more embodiments. As shown in FIG. 1A, deformation sensing apparatus 100 includes a wave propagation channel 110 and an emitter-detector pair 120 coupled to a first common end of the propagation channel. FIGS. 1B-1C illustrate side views of the wave reflection deformation sensing apparatus 100 with bends at different points along a length of the channel 110. For sake of comparison, the bend angles of FIGS. 1B and 1C are substantially identical.

Figure 2A:
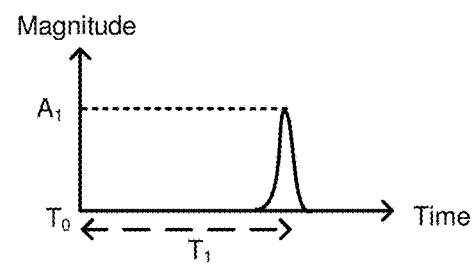
FIGS. 2A-2C illustrate timings of reflected waves within propagation channels of the wave reflection deformation sensing apparatus illustrated in FIGS. 1A-1C, in accordance with one or more embodiments.
Figure 2B:
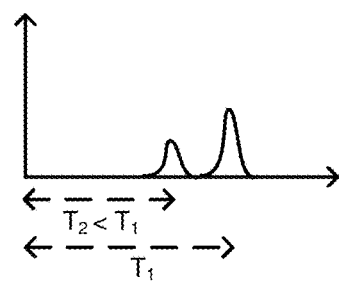
Figure 2C:
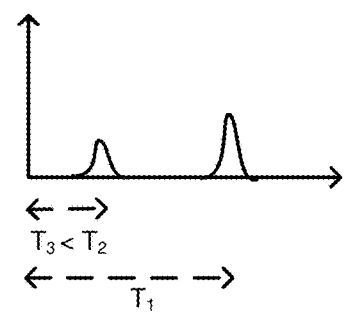

FIGS. 2A-2C illustrate timings of reflected waves within propagation channels of the wave reflection deformation sensing apparatus with deformations applied as illustrated in FIGS. 1A-1C, respectively, in accordance with one or more embodiments. In some embodiments, the locations of bends of the propagation channel impact and can be resolved based on characteristics (e.g., timings, such as propagation times) of the received reflected signal pulses. For instance, as illustrated in FIGS. 1A-1C and 2A-2C, propagation times or intervals (e.g., $T_1$, $T_2$, $T_3$) of the reflected pulses (e.g., measured relative to an injection time $T_0$ of the transmitted signal pulse) can be used to determine locations ($L_2$ and $L_3$) of one or more bends along the channel length. Bends located closer to the injection point (e.g., $L_3 < L_2$, as in FIG. 1C versus as in FIG. 1B) of the transmitted pulse will result in a shorted propagation time (e.g., $T_3 < T_2$, as illustrated in FIG. 2C versus FIG. 2B) of reflected pulse. FIGS. 2B and 2C illustrate each a reflection at the same time T1 as in FIG. 2A with an amplitude less than an amplitude (A1) of the reflection at T1 shown in FIG. 2A. In FIG. 2B, the total amplitude of the reflections at T1 and T2 is equal to A1. In FIG. 2C, the total amplitude of the reflections at T1 and T3 is equal to A1.

In some embodiments, complex impedances may be used for disambiguating echoes from multiple bends. A transmission line may be modeled simply as a series of two-port elementary components, each representing a short segment of the transmission line. A two-port elementary component (also referred to a "lumped model element") includes two conductors (a signal wire and a return wire); a series resistor, Rdx (expressed in Ohms per unit length), that represents a distributed resistance of the conductors; a series inductor, Ldx (expressed in Henries per unit length), describing a distributed inductance (due to the magnetic field around the wires, self-inductance, etc.); a shunt capacitor, Cdx (Farads per unit length), between the signal wire and the return wire that describes a capacitance between the two conductors; and a conductance, Gdx (expressed in (Siemens per unit length) of the dielectric material separating the two conductors is represented by a shunt resistor between the signal wire and the return wire.

The nature of a bend has different effects on lumped elements of a transmission line. Each lumped model element is associated with a corresponding length of transmission line ($\Delta z$). The energy put in to the transmission line is a wide spectrum. A bend in the transmission line has a chiastic manipulation of the transmission line, e.g. twist, stretch, compression, etc. The behavior of different lumped elements of a multi-segment indexable sensor is further described in U.S. patent application Ser. No. 15/382,496, filed on Dec. 16, 2016, which is hereby incorporated by reference in its entirety. Additionally, in cases where there are a plurality of bends in the transmission line, the bends have different chiastic manipulations of the transmission line.

Each bend can be considered to be made up of a set of incremental or lumped elements connected together. As each bend element is distributed along the line each bend element gives a return characteristic of its relationship with its neighbor. The returns are temporally separated by the speed of propagation of the stimulus along the transmission line. And the characteristic of the reflection is related to the relative manipulation that occurred at that point in the line. The magnitude of the reflection relates to changes in the change in characteristic impedance. The frequency and phase components of that energy relate to changes in Cdx and Ldx. Thus by analyzing the nature of the return signals the relative bend elements may be located.

Figure 3A:
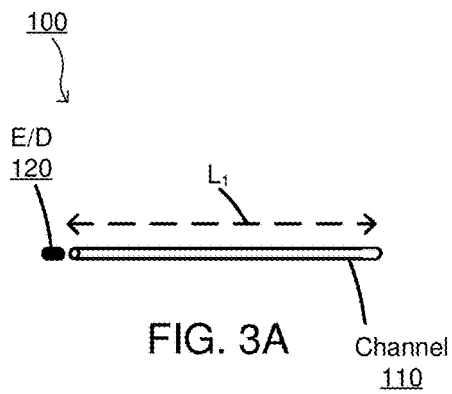
FIGS. 3A-3C illustrate side views, of a wave reflection deformation sensing apparatus, with different measures of bends at a given point along a length-axis of the apparatus, in accordance with one or more embodiments.
Figure 3B:
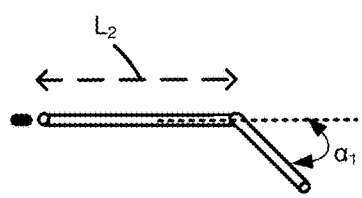
Figure 3C:
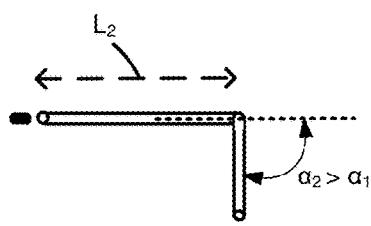

FIGS. 3A-3C illustrate side views, of a wave reflection deformation sensing apparatus 100, with different measures of bends at a given point along a length-axis of the apparatus, in accordance with one or more embodiments. FIG. 3A illustrates the deformation sensor 100 in the absence of any deformation. FIGS. 2B-2C illustrate a two different measures of flexion (flex deformation) of the deformation sensor 100, resulting in an arcing or bending of the channel 110 by different bend angles, at the same given point along the length of the channel 110.

Figure 4A:
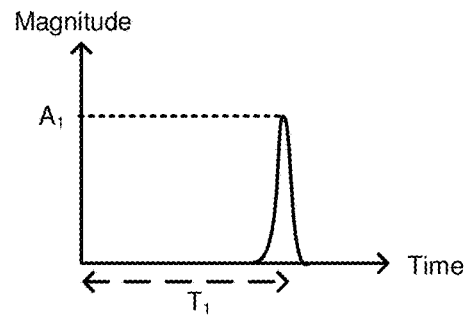
FIGS. 4A-4C illustrate magnitudes of reflected waves within propagation channels of the wave reflection deformation sensing apparatus with deformations applied as illustrated in FIGS. 3A-3C, in accordance with one or more embodiments.
Figure 4B:
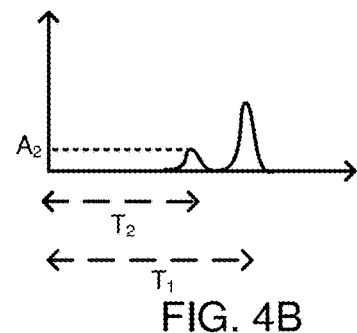
Figure 4C:
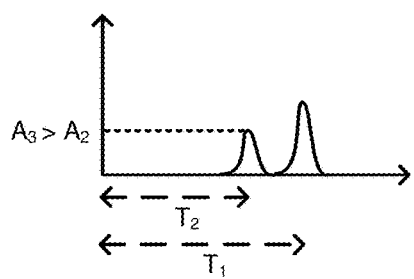

FIGS. 4A-4C illustrate magnitudes of reflected waves within propagation channels of the wave reflection deformation sensing apparatus with deformations applied as illustrated in FIGS. 3A-3C, in accordance with one or more embodiments. In some embodiments, the angles of bends along the propagation channel impact and can be resolved based on characteristics (e.g., amplitudes) of the received reflected signal pulses from those bends. For instance, as illustrated in FIGS. 3A-3C and 4A-4C, amplitudes (e.g., $A_1$, $A_2$, $A_3$) of the reflected pulses can be used to determine angles ($\alpha_1$ or $\alpha_1$) of one or more bends along the channel length. Stated differently, amplitudes of the reflected pulses can be used to compute corresponding bend angles—a greater distortion in the channel results in a stronger reflection (e.g., larger impedance mismatch) and, consequently, a greater amplitude of reflected pulse.

A bend in a transmission line causes changes in its characteristic impedance. Accordingly, a magnitude of a reflection ($\Gamma$) is related to an amount of line deformation which is related to an amount of bend in the transmission line.

$$\Gamma = \frac{Z_l - Z_s}{Z_l + Z_s}, \tag{1}$$

where $Z_s$ is lumped impedance before the bend, and $Z_1$ is lumped characteristic impedance in an element of the bend. This means the reflection is related to the delta impedances of the line along its length.

The characteristic impedance of the transmission line is represented as:

$$Z_s = \sqrt{\frac{R + j\omega Ldx}{Gdx + j\omega Cdx}}, \qquad (2)$$

where $Z_s$ is the characteristic impedance, $j\omega$ is an imaginary angular frequency, and Rdx, Gdx, Ldx, and Cdx are as described previously. The characteristic impedance of the transmission line may be mapped to various amounts of bend. Using this mapping, values of the characteristic impedance of the line may be used to determine an amount of bend in the transmission line.

FIGS. 4B and 4C illustrate each a reflection at the same time T1 as in FIG. 4A with an amplitude less than an amplitude (A1) of the reflection at T1 shown in FIG. 4A. In FIGS. 4B and 4C, the total amplitude of the reflections at T1 and T2 is equal to A1.

Figure 5:
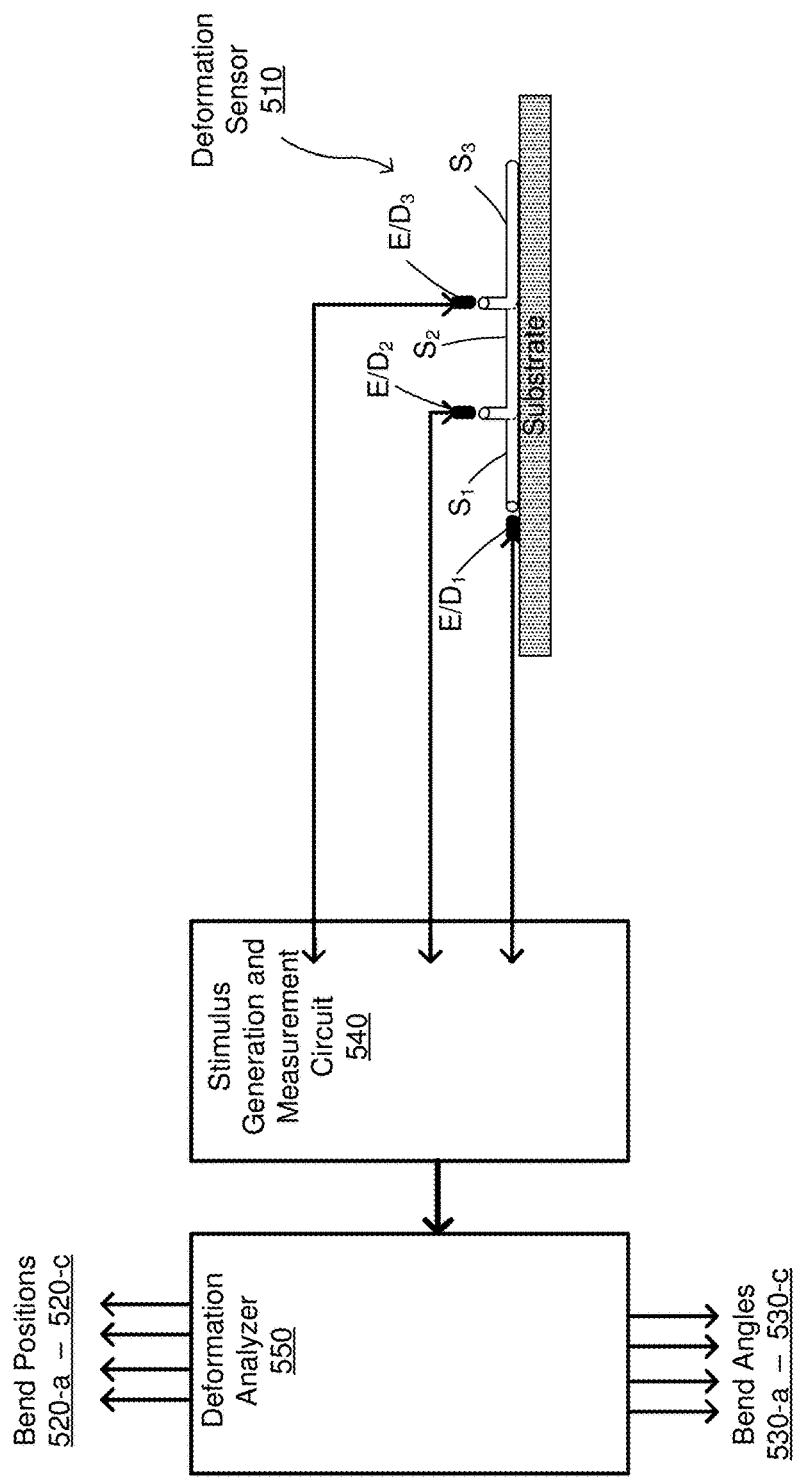
FIG. 5 illustrates a deformation sensing system including a wave reflection deformation sensing apparatus, according to one or more embodiments.

FIG. 5 illustrates a deformation sensing system 500 including a wave reflection deformation sensing apparatus 510, according to one or more embodiments. As illustrated in FIG. 5, deformation sensing system 500 includes the wave reflection deformation sensing apparatus 510, a stimulus generation and measurement circuit 540, and a deformation analyzer 550. In some embodiments, and as illustrated in FIG. 5, the wave reflection deformation apparatus 510 comprises multiple cascaded segments of propagation channels (e.g., S1, S2, and S3) formed along a length of the apparatus 510 and separated from one another by emitter-detector pairs (e.g., E/D$_1$, E/D$_2$, and E/D$_3$). Alternatively, the wave reflection deformation sensing apparatus comprises a single propagation channel coupled to one or more emitter detector pairs (as described with reference to FIGS. 1-4).

In the case of a multi-segment sensor, by activating or interrogating the different segments of channels using appropriate E/D pairs, different portions of the combined length of deformation sensing apparatus can be indexed to resolve the different spatial locations of bends occurring along different segments of the combined channel length. For example, E/D$_1$ can be configured to transmit and receive a pulse along segment S$_1$ to detect a bend along segment S$_1$; E/D$_2$ can be configured to transmit and receive a pulse along segment S$_2$ to detect a bend along segment S$_2$; and E/D$_3$ can be configured to transmit and receive a pulse along segment S$_3$ to detect a bend along segment S$_3$. Thus, using a multi-segment channel 510, the deformations of different regions (e.g., spatial portions) of the multi-segment channel 510 can be determined or resolved by activating and interrogating different segments of the multi-segment channel.

In some embodiments, the stimulus generation and measurement circuit 540 generates stimulus signals that activate (e.g., turn on) or deactivate (e.g., turn of) emitters and/or detectors to inject signal pulses (e.g., electromagnetic or acoustic signals) into the channel or into specific segments or portions of the channel. The stimulus generation and measurement circuit 540 then detects and measures reflected signals received from the channel or channel segments and sensed by the detectors in response to an applied deformation. In some embodiments, in a cascaded multi-segment channel, different E/D pairs can be activated to interrogate different portions of the multi-segment channel. Correspondingly, locations and measures of bend deformations at different probed portions along a length of the multi-segment wave reflection deformation sensing apparatus can be resolved. The activation and interrogation of different segments of a multi-segment indexable sensor is further described in U.S. patent application Ser. No. 15/382,496, filed on Dec. 16, 2016, which is hereby incorporated by reference in its entirety.

In some embodiments, the reflected signal (in response to a transmitted signal pulse) is indicative of a location and measure of bend deformation along the channel. The location of a bend along a channel can be computed based on the roundtrip time (time) between the stimulus transmission time and received reflection time and based on the speed of propagation (velocity) of the signal in the medium. Using the formula (3) and (4):

Distance(total)=velocity*time (3)

Distance to bend=Distance(total)/2 (4)

The speed of propagation is dependent on the type of pulse (electrical, acoustic, optical) and the material of the propagation channel—typically this speed has a value between the speed of light in a vacuum ($3 \times 10^8$ m/s) and the speed of sound in air (343 m/s).

In some embodiments, the measurement circuit 540 measures timing and amplitude of the reflected pulse(s) received at the detector(s) relative to a timing and amplitude of the pulse injected by the emitter.

In some embodiments, the deformation analyzer 550 computes a location (e.g., position along the channel length) of bend and a measure of bend (e.g., a bend angle) in one or more regions of the sensing apparatus 510, based on the measured reflected pulses (as explained with reference to FIGS. 1A-1C, 2A-2C, 3A-3C, and 4A-4C).

FIGS. 6A-6D include illustrations of a bend angle sensor worn on a finger and comprising one or more wave reflection deformation sensors, according to one or more embodiments. FIGS. 6E-6H illustrate amplitudes and timings of reflected waves within propagation channels of the wave reflection deformation sensors, illustrated in FIGS. 6A-6D, respectively, for measuring bend locations and bend angles of different joints of the finger, according to one or more embodiments. In some embodiments, the use of a wave reflection sensor, for instance, in a wearable device is beneficial within a region of the wearable device that internally undergoes different measures of bends, along the different portions of the sensor. For instance, a body part (such as a finger) may bend at one or more locations along a length of a channel of the sensor. In such cases, a location and measure (angle) of bending can be more precisely resolved based on the characteristics (amplitude and timing) of a pulse reflected within the propagation channel at the bend.

As illustrated in FIGS. 6A-6D, a contour of the wave reflection deformation sensor 100 undergoes modifications as a function of a location and angle of bending of the finger. In some embodiments, the propagation channel is formed over regions of the finger (or other body part) that are most likely to undergo a bend (e.g., over articulating joints like the finger knuckles). The emitters and/or detectors (E/D 120-$a$ and/or E/D 120-$b$) are optionally positioned in portions of the finger (or other body part) least likely to undergo bends (e.g., over the finger segments formed between the knuckles).

In some embodiments, the locations of bends and bend angles of each individual joint (e.g., individual angles $\rho_{21}$, $\rho_{22}$, $\rho_{23}$ illustrated in FIG. 6C, or individual angles $\rho_{31}$, $\rho_{32}$, $\rho_{33}$ illustrated in FIG. 6D) may individually be resolved based on the characteristics (e.g., timings and amplitudes) of the received reflected signal pulses. For instance, as illustrated in FIGS. 6E-6H, propagation times or intervals (e.g., $T_2$, $T_3$, $T_4$) of the reflected pulses (e.g., measured relative to an injection time $T_0$ of the transmitted signal pulse) are used to determine locations of one or more bends along the channel length. Bends located closer to the injection point of the transmitted pulse will result in a shorted propagation time of reflected pulse. Furthermore, amplitudes of the reflected pulses are used to compute corresponding bend angles. A greater distortion in the channel results in a greater amplitude of reflected pulse.

As one example, and as shown in FIGS. 6F versus 6H, the magnitude of each of the three reflected pulses increases as the corresponding bend deformation (in FIG. 6C versus FIG. 6D, respectively) increases; the timings of each the three pulses are substantially the same (as illustrated by the intervals $T_2$, $T_3$, $T_4$ in FIGS. 6F and 6H), since the locations of the three bends are substantially the same (as shown in FIGS. 6C and 6D). FIGS. 6F-6H illustrate each a reflection at the same time T1 as in FIG. 6E with an amplitude less than an amplitude (A1) of the reflection at T1 shown in FIG. 6E. In FIG. 6F, the total amplitude of the reflections at T1 and T2 is equal to A1. In FIGS. 6G-6H, the total amplitude of the reflections at T1, T2, T3, and T4 is equal to A1.

Alternatively, or in addition, in some embodiments, a bend angle (e.g., $\rho_1$, $\rho_2$, $\rho_3$) of the entire finger is computed based on the deformations of different portions of the wave reflection deformation sensor, by combining the location and angles of the individual bends.

FIGS. 7-10 illustrate examples of wearable systems that include one or more wave reflection deformation sensors, according to one or more embodiments.

In one or more embodiments, a wearable device or system comprises one or more wave reflection deformation sensors (such as those explained with reference to FIGS. 1-6). The wearable device or system may also include the stimulus generation and measurement circuit and deformation analyzer (explained with reference to FIG. 5). Alternatively, the wearable device may include the deformation sensor (and optionally the stimulus generation and measurement circuit) and the first and second signals may be sent to a remote (e.g., non-wearable) system or device; the remote system or device may include the measurement circuit and/or the deformation analyzer.

In some embodiments, alignment of the shapes of the propagation channels of the wave reflection sensor are configured to circumscribe or surround one or more articulating joints. As a result, when the wearable device is positioned or worn around the joints, a movement of the joints results in a corresponding deformation of different portions of the wave reflection deformation sensor and a reflection of signals arising from bends in the joints, responsive to an injected signal. Then, using the approaches described herein, a location and/or angle of bend deformation of the different joints can be resolved and independently determined based on the timings and amplitudes of the reflected pulses.

Figure 7:
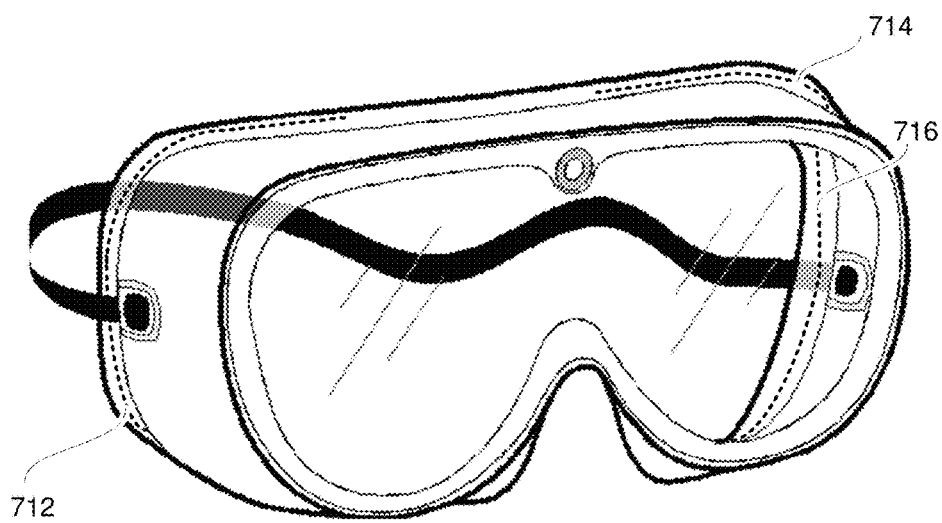
FIGS. 7-10 illustrate examples of wearable systems that include one or more wave reflection deformation sensors, according to one or more embodiments.
Figure 8:
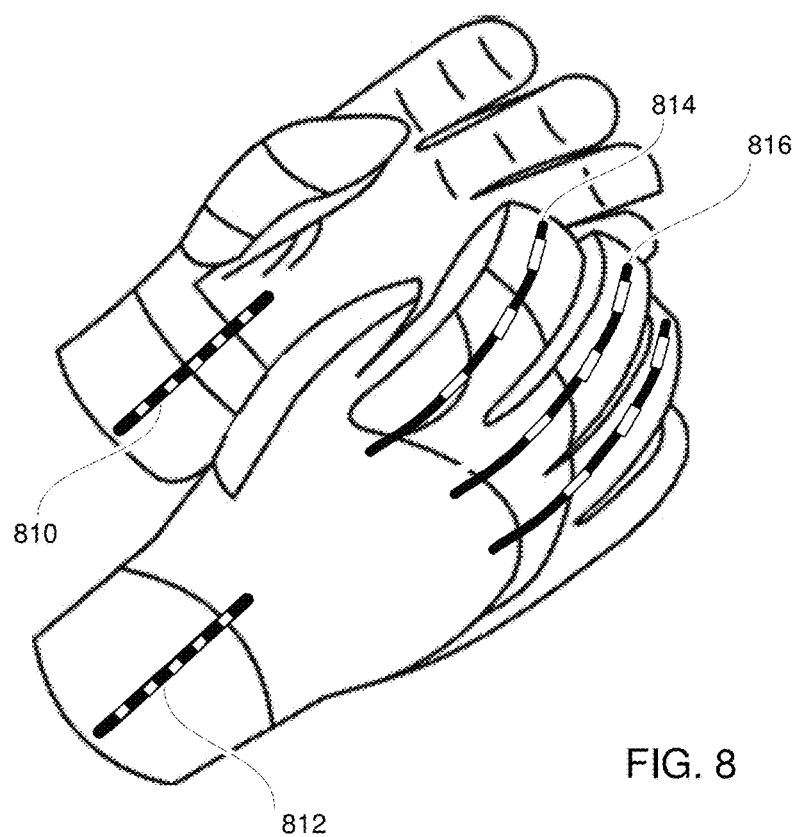
Figure 9:
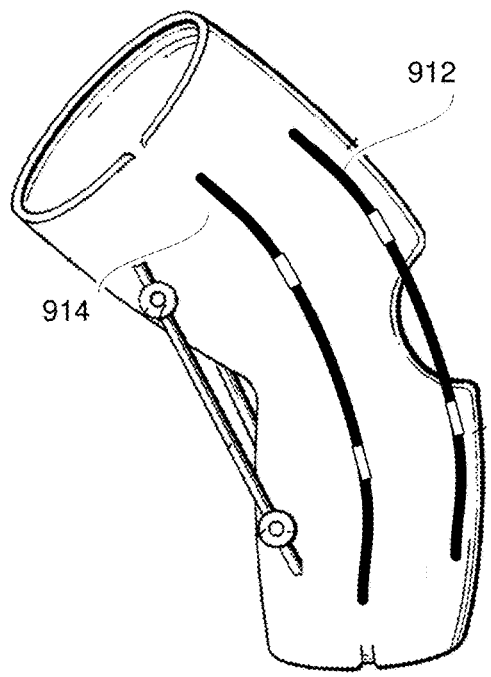

In some embodiments, the wearable device is a wearable headset (e.g., in FIG. 7) to be worn around a portion of the face. Correspondingly, the wave reflection deformation sensors 712, 714, 716 are arranged to be substantially concentric with (circumscribing) sockets of the eyes or aligned with portions of the forehead and cheek bone as shown in FIG. 7, thus sensing movements of these spatial regions of these body parts.

In some embodiments, the wearable device is a glove (e.g., in FIG. 8) to be worn around the hand or a cover (e.g., thimble or guard band) to be worn over a finger or wrist. Correspondingly, the wave reflection deformation sensor is arranged to be substantially aligned with joints of one or more fingers (814 and 816) or the wrist joint (810 and 812) when the device is worn around the fingers or wrist. Alternatively or in addition, the wave reflection deformation sensor is arranged to be above, below, or on a side of one or more joints.

In some embodiments, the wearable device is a brace (e.g., in FIG. 9) to be worn over a knee, elbow, ankle, or shoulder joint. Correspondingly, the wave reflection deformation sensors may be arranged to be substantially along a length of and over the knee (912), elbow, ankle, or shoulder joint. Alternatively, or in addition, the wave reflection deformation sensor may be arranged to be above, below, or on a side (914) of the joint.

Figure 10:
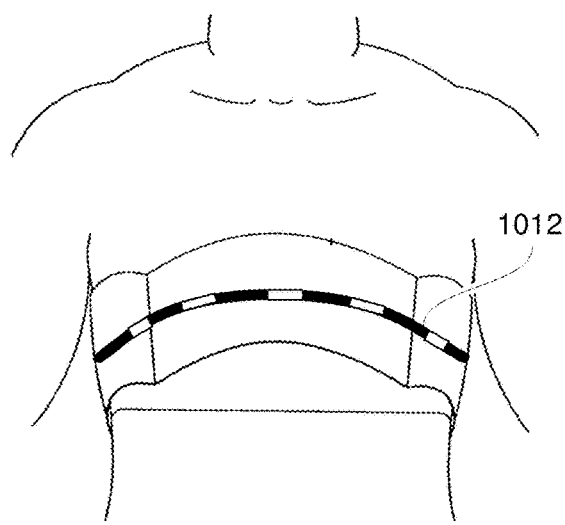

In some embodiments, the wearable device is a support brace to be worn over a neck or torso part (e.g., chest, back, or waist; as shown in FIG. 10). Correspondingly, the wave reflection deformation sensor is arranged to be follow a contour of the neck or torso part (e.g., 1012).

In one or more embodiments, the disclosed approaches, systems, and methods for spatially resolving deformation (e.g., sensing bend locations, bend angles, and angular separations) are used in conjunction with a virtual reality (VR) system. For example, the disclosed approaches for detecting bends of body parts, bend angles, and angular separations of fingers or other body parts are used to provide information about or to render a state of the hand (or other body part) in a VR environment or VR world. For example, states of a hand (e.g., open, closed, pointing, gesturing, etc.) can be determined based on the detected disposition of fingers of the hand.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments are intended to be illustrative, but not limiting, of the scope of the embodiments, which is set forth in the following claims.

What is claimed is:

1. A deformation sensing apparatus comprising:
   a propagation channel;
   a transmitter coupled to the propagation channel and configured to transmit a signal from a first end of the propagation channel along a length of the propagation channel; and
   a receiver coupled to the propagation channel and configured to:
      detect a first reflected signal corresponding to a first reflection of the signal along the length of the propagation channel, and
      responsive to a bend in the propagation channel, detect a second reflected signal corresponding to a second reflection of the signal from a position of the bend along the length of the propagation channel.

2. The deformation sensing apparatus of claim 1, wherein the second reflection is caused by a change of impedance of the propagation channel at the location of the bend along the length.

3. The deformation sensing apparatus of claim 2, wherein in an amplitude of the second reflected signal corresponds to a bend angle of the bend in the propagation channel, the amplitude of the second reflected signal being proportional to the change of impedance of the propagation channel.

4. The deformation sensing apparatus of claim 3, wherein amplitudes of the second reflected signal are each mapped to different bend angles in the propagation channel.

5. The deformation sensing apparatus of claim 3, further comprising:
a measurement circuit coupled to the receiver and configured to measure the amplitude of the second reflected signal; and
a deformation analyzer configured to determine the position of the bend along the length of the propagation channel based on a propagation time associated with the second reflected signal.

6. The deformation sensing apparatus of claim 5, wherein a bend in the propagation channel located closer to the receiver are associated with shorter propagation times relative to bends located farther down the length of the propagation channel.

7. The deformation sensing apparatus of claim 1, wherein the deformation sensing apparatus is used in wearable device including at least one of a glove, headset, or body of a user.

8. A deformation apparatus comprising:
a plurality of propagation channels formed on a length of the deformation apparatus, each propagation channel corresponding to a segment of the deformation apparatus and separated from another propagation channel by a resolving element; and
a measurement circuit configured to:
apply a signal to the plurality of propagation channels, and
for each propagation channel,
detect a first reflected signal corresponding to a first reflection of the signal along the length of the propagation channel, and
responsive to a bend in the propagation channel, detect a second reflected signal corresponding to a second reflection of the signal from a position of the bend along the length of the propagation channel.

9. The deformation apparatus of claim 8, wherein the second reflection is caused by a change of impedance of the propagation channel at the location of the bend along the length.

10. The deformation apparatus of claim 9, wherein in an amplitude of the second reflected signal corresponds to a bend angle of the bend in the propagation channel, the amplitude of the second reflected signal being proportional to the change of impedance of the propagation channel.

11. The deformation apparatus of claim 10, wherein amplitudes of the second reflected signal are each mapped to different bend angles in the propagation channel.

12. The deformation apparatus of claim 10, further comprising:
a measurement circuit coupled to the receiver and configured to measure the amplitude of the second reflected signal; and
a deformation analyzer configured to determine the position of the bend along the length of the propagation channel based on a propagation time associated with the second reflected signal.

13. The deformation apparatus of claim 12, wherein a bend in the propagation channel located closer to the receiver are associated with shorter propagation times relative to bends located farther down the length of the propagation channel.

14. The deformation apparatus of claim 8, further comprising:
an elastic substrate on which the plurality of propagation channels of the deformation apparatus are formed, wherein the deformation apparatus is configured to be worn by a user as a wearable device.

15. The deformation apparatus of claim 14, wherein the second reflection is caused by a change of impedance of the propagation channel at the location of the bend along the length.

16. The deformation apparatus of claim 15, wherein in an amplitude of the second reflected signal corresponds to a bend angle of the bend in the propagation channel, the amplitude of the second reflected signal being proportional to the change of impedance of the propagation channel.

17. The deformation apparatus of claim 16, wherein amplitudes of the second reflected signal are each mapped to different bend angles in the propagation channel.

18. The deformation apparatus of claim 16, further comprising:
a measurement circuit coupled to the receiver and configured to measure the amplitude of the second reflected signal; and
a deformation analyzer configured to determine the position of the bend along the length of the propagation channel based on a propagation time associated with the second reflected signal.

19. The deformation apparatus of claim 18, wherein a bend in the propagation channel located closer to the receiver are associated with shorter propagation times relative to bends located farther down the length of the propagation channel.

20. The deformation apparatus of claim 18, wherein the wearable device is used in at least one of a glove, headset, or body of a user.

* * * * *